United States Patent [19]
Ostrander et al.

[11] Patent Number: 5,533,761
[45] Date of Patent: Jul. 9, 1996

[54] QUICK CONNECTOR RELEASE MEMBER

[75] Inventors: James E. Ostrander, Waterford; Gary O. Klinger, Warren, both of Mich.

[73] Assignee: ITT Corporation, New York, N.Y.

[21] Appl. No.: 329,491

[22] Filed: Oct. 26, 1994

[51] Int. Cl.$^6$ ........................................ F16L 35/00
[52] U.S. Cl. .................. 285/38; 285/39; 285/175; 285/308; 285/319
[58] Field of Search ................................ 285/308, 319, 285/38, 39, 175, 387, 325; 29/237

[56] References Cited

U.S. PATENT DOCUMENTS

| | | |
|---|---|---|
| 546,732 | 9/1895 | Desserich . |
| 2,962,688 | 11/1960 | Werner . |
| 4,055,359 | 10/1977 | McWethy . |
| 4,293,149 | 10/1981 | Bonel . |
| 4,781,400 | 11/1988 | Cunningham . |
| 4,793,637 | 12/1988 | Laippley et al. . |
| 4,919,457 | 4/1990 | Moretti ................................ 285/39 |
| 4,923,228 | 5/1990 | Laipply ................................ 285/319 |
| 4,927,185 | 5/1990 | McNaughton . |
| 4,979,765 | 12/1990 | Bartholomew ............... 285/308 X |
| 5,056,756 | 10/1991 | Norkey et al. . |
| 5,084,954 | 2/1992 | Klinger . |
| 5,112,085 | 5/1992 | Busch . |
| 5,161,834 | 11/1992 | Norkey . |
| 5,172,940 | 12/1992 | Usui et al. . |
| 5,187,851 | 2/1993 | Klinger . |
| 5,213,376 | 5/1993 | Szabo . |
| 5,219,188 | 6/1993 | Abe et al. . |
| 5,226,230 | 7/1993 | Klinger . |
| 5,226,678 | 7/1993 | Petranto ........................ 285/387 X |
| 5,228,728 | 7/1993 | McNaughton et al. . |
| 5,267,757 | 12/1993 | Dal Palù. |
| 5,301,408 | 4/1994 | Berman et al. . |
| 5,303,963 | 4/1994 | McNaughton et al. . |

FOREIGN PATENT DOCUMENTS

| | | |
|---|---|---|
| 2205136 | 11/1988 | United Kingdom . |
| 9104435 | 4/1991 | WIPO . |

OTHER PUBLICATIONS

Tools & Equipment for the Professional, OTC ® Catalog No. A–91, 1991, p. 48.
Motormite Catalog, Motormite Mfg., Division of R & B, Inc., Jun. 1991, Cover, p. 246 and Back.
New Tools News, K–D Tools, Jun., 1991.

*Primary Examiner*—Dave W. Arola
*Attorney, Agent, or Firm*—Robert P. Seitter; J. Gordon Lewis

[57] ABSTRACT

A release member for a quick connector engagable with a fitting. The release member includes a body formed of a resilient material and having first and second end portions, with a slot extending longitudinally through the first and second end portions for mounting of the release member over the fitting and to enable axial sliding movement of the release member through an open end of the quick connector into engagement with a retainer mounted within the quick connector to effect release of legs of the retainer from an annular flange on the fitting and disengagement of the connector from the fitting. A radially enlarged flange is formed between the first and second end portions to form a tool engagable surface on the body for forcible sliding movement of the body into the open end of the connector. Alternately, a recess or a projection may be provided on the body to form the tool engagable surface.

18 Claims, 4 Drawing Sheets

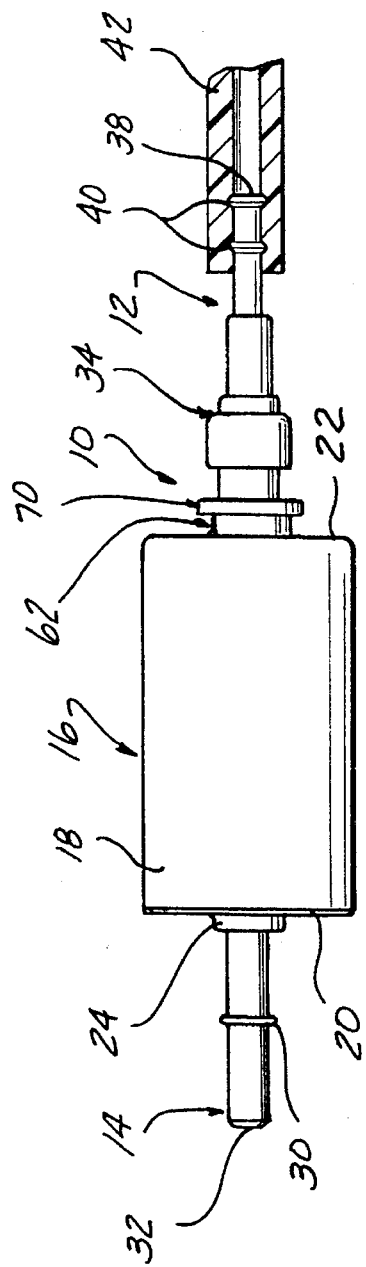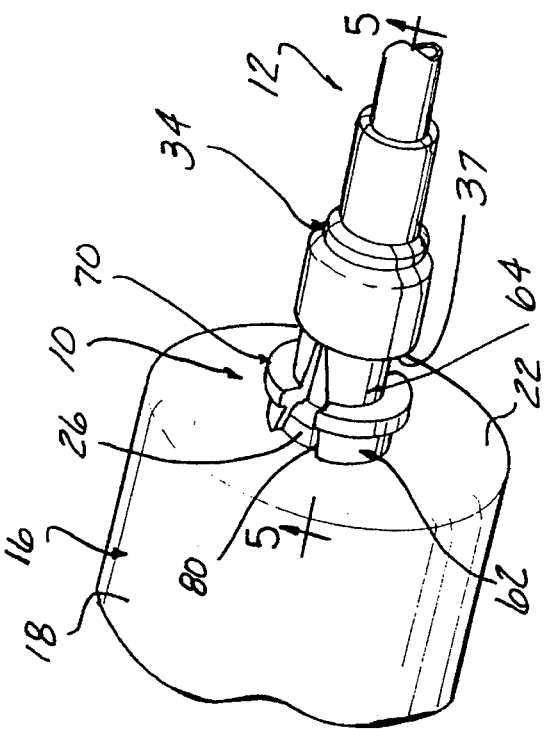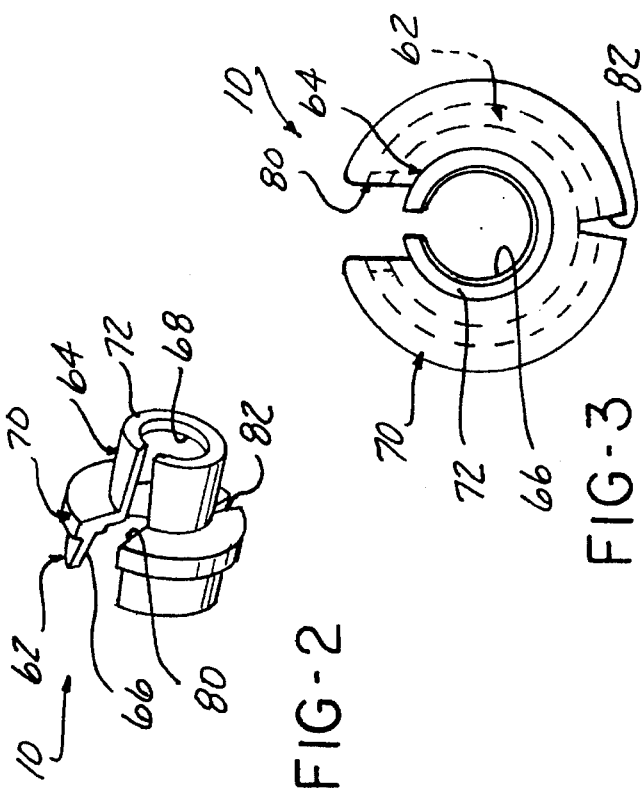

QUICK CONNECTOR RELEASE MEMBER

BACKGROUND OF THE INVENTION

1. Field of the Invention

The present invention relates, in general, to snap-fit or quick connectors and, specifically, to quick connectors employed in fluid conduit systems to facilitate assembly and disassembly of fluid components.

2. Background Description

Quick connectors have long been used to facilitate the assembly and disassembly of mechanical devices. This is particularly true in complex automotive systems wherein numerous fluid conduit interconnections are required.

In such quick connectors, a retainer is typically mounted within a female connector part in a relatively inaccessible position to lock a male connector part or fitting inserted into the female connector part. In order to separate the fitting from the female connector, it is necessary to expand the deflectable legs on the retainer in a radially outward direction to enable an enlarged, annular abutment surface typically formed on the fitting to pass by the ends of the legs and be removed from the female connector. Tools are frequently employed to effect the release of quick connect fittings by deflecting the retainer legs as shown in U.S. Pat. Nos. 5,084,954, 5,187,851 and 5,226,230.

Certain quick connector designs have a release member slidably mounted on the female connector part as shown in U.S. Pat. Nos. 4,793,637, 5,056,756, 5,161,834 and 5,228,728. Such release members are slidable into the female connector part to engage and radially expand the deflectable legs of the retainer member to enable the enlarged annular abutment surface on the fitting to be easily removed from the female connector.

However, in certain applications, the open end of the quick connector is located in a relatively inaccessible position and is closely surrounded by other components which make the use of a separate tool to separate the fitting from the female connector part relatively difficult if not impossible due to limited available space. Such limited space factors also make the quick connectors employing an integral release member on one of the components difficult to remove from the fitting.

In an exemplary application, a fuel filter used in a motor vehicle has generally a cylindrical shape with opposed end walls. Short fittings extend axially outward from each end wall of the filter. Quick connectors carrying a fuel conduit at one end are releasibly attachable to each fitting to connect the filter in the fuel delivery system of the vehicle. In a typical position, the quick connector is positioned such that the open end of the quick connector is located in close proximity to one of the end walls of the filter. This limited space between the end of the quick connector and the end wall of the filter is insufficient for the insertion of the above-described release tools about the fitting and into engagement with the retainer to effect de-coupling of the connector from the fitting or to permit axial movement of an integral release member mounted in the quick connector.

The previously devised release tools for quick connectors, while generally effective for their intended purpose, have a certain axial length for internal engagement with the retainer or to actuate the integral release member. This axial length prohibits the mounting of the tools about the fitting between the end of the connector or the integral release member mounted in the connector and surrounding structure, barriers or components where accessible space is limited.

Thus, it would be desirable to provide a release tool or member for use with quick connectors employed in fluid conduit systems which is usable to effect de-coupling of a quick connector from a fitting despite limited space between the end of the connector and surrounding components or structures. It would also be desirable to provide a release tool for quick connectors which can be provided in different sizes for use with different sized connectors and fluid fittings or conduits.

SUMMARY OF THE INVENTION

The present invention is a release member or tool for releasing a quick connector from a male connector part or fitting coupled together by a retainer element mounted in the quick connector and having at least one deflectable leg.

The release member includes a body having first and second tubular end portions. A through bore extends through each of the first and second end portions, with the bores being co-axial and disposed in communication with each other. A first longitudinally extending break means, such as a slot, is formed in and through the first and second end portions to enable the body to be snapped over the male connector part or fitting. A retainer leg engaging surface means is formed on the second end portion of the body and is engagable with the retainer leg upon axial movement of the release member into the open end of the connector to radially outwardly deflect the at least one deflectable leg a sufficient distance to enable a radial abutment surface on the fitting to be disengaged from the retainer element and separated from the connector. The retainer leg engaging surface means is preferably in the form of an inwardly tapering surface formed on the outer end of the second end portion. The tapering surface can have an arcuate or sharp pointed outer edge.

The release member further includes an engagable surface means, formed on the body, for facilitating axial sliding movement of the body along the male connector part. The engagable surface means preferably includes a flange integrally formed on the body between the first and second end portions and extending radially outward from the first and second end portions. In addition to or complimentary with the flange, the engageable surface means may also include a recess or a raised projection formed on the first end portion of the body for engaging a tool to effect axial sliding movement of the body along the male connector part.

The body is preferably formed of a resilient plastic material. Optionally, at least one additional radial break, such as a slot, is formed in the flange, circumferentially spaced from the first break means, to facilitate a snap action of the body over the male connector part. Preferably additional, the radial break or slot is diametrically opposed to the first break means.

In certain applications, the fitting is mounted on an element or component, such as a fuel filter, fuel tank, or fuel rail, having a radially expanded shoulder on at least one end wall concentrically surrounding a portion of the fitting. The first end portion of the release member has an inner diameter sized to be mountable about the shoulder. The second end portion of the release member has an inner diameter for slidable mounting over an adjacent portion of the male connector part.

The release member is snapped over the fitting and is axially slidable along the fitting a sufficient distance such that the retainer leg engaging surface formed on the second end portion of the release member engages and deflects the retainer leg or legs radially outward from the flange on the fitting to permit disengagement of the quick connector and the fitting.

The engageable surface is adapted to receive a suitable tool, such as a screwdriver, a fork-like tool, etc., to forcibly slide the release member into the open end of the quick connector to effect disengagement of the quick connector and the fitting.

The release member of the present invention is advantageously employed in applications having limited axial access space between the end of a quick connector and surrounding structure or components. The release member is also provided with engagable surface means to receive a tool to provide the necessary force to de-couple the male connector part or fitting from the quick connector. Finally, the release member of the present invention is of simple construction for a low manufacturing cost.

BRIEF DESCRIPTION OF THE DRAWING

The various features, advantages and other uses of the present invention will become more apparent by referring to the following detailed description and drawing in which:

FIG. 1 is a side elevational view showing the release member of the present invention in an operable position for disengaging a quick connector from a fitting mounted on a fuel filter;

FIG. 2 is a perspective view of the release member of the present invention;

FIG. 3 is an enlarged right-hand end view of the release member shown in FIG. 2;

FIG. 4 is a perspective view of the release member, fuel filter and fitting shown in FIG. 1;

DESCRIPTION OF THE PREFERRED EMBODIMENTS

Figure 5:
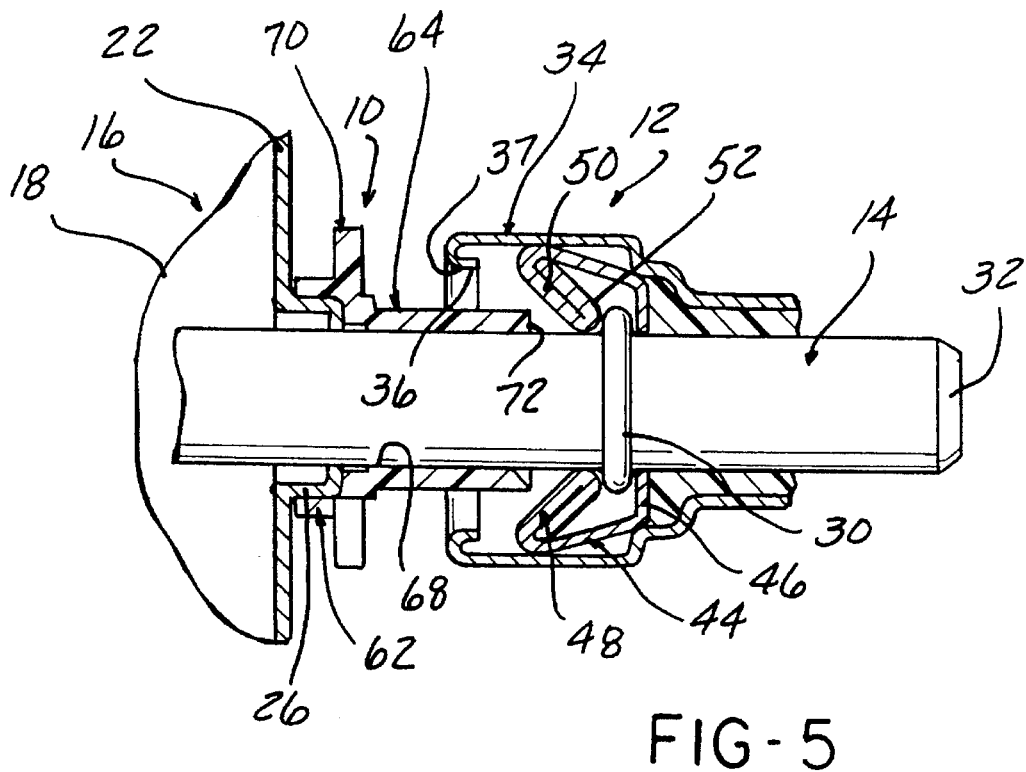
FIG. 5 is a cross sectional view generally taken along line 5—5 in FIG. 4 and further including a quick connector mounted on the fitting.

Referring now to the drawing, and to FIGS. 1–5 in particular, there is depicted a release member or tool 10 for use with a quick connector 12 releasably attached to a fitting 14 carried on various components, such as fuel filters, fuel rails, fuel tanks, etc. The release member 10 provides an expedient means to disengage a retainer element mounted in the quick connector 12, as described hereafter, from the male connector part or fitting 14 to permit removal of the quick connector 12 from the fitting 14.

By way of example only, the release member 10 is depicted in FIGS. 1 and 5 as being used in connection with a fuel filter 16. It will be understood that the following description relating to the fuel filter 16 is by way of example only, as the release member 10 may be used with a wide variety of diverse components having a male connector part or fitting 14 mounted therein.

As shown in FIGS. 1–5, the fuel filter 16 includes a cylindrical body 18 having opposed end walls 20 and 22. Hollow, annular shoulders 24 and 26 are integrally mounted on each end wall 20 and 22, respectively, and concentrically surround and support a portion of the fitting 14. The fittings 14 extend axially outward from each end wall 20 and 22.

It will be understood that the annular shoulders 24 and 26 are optional as the fuel filter 16 as well as other components may not include such annular shoulders 24 or 26.

As is conventional, the typical fitting 14 used with the quick release connector 12 has a radially raised upset or flange 30 formed intermediate opposite ends. As shown in FIGS. 1 and 5, the upset or flange 30 is spaced from the first outer end 32 of the fitting 14.

Figure 9:
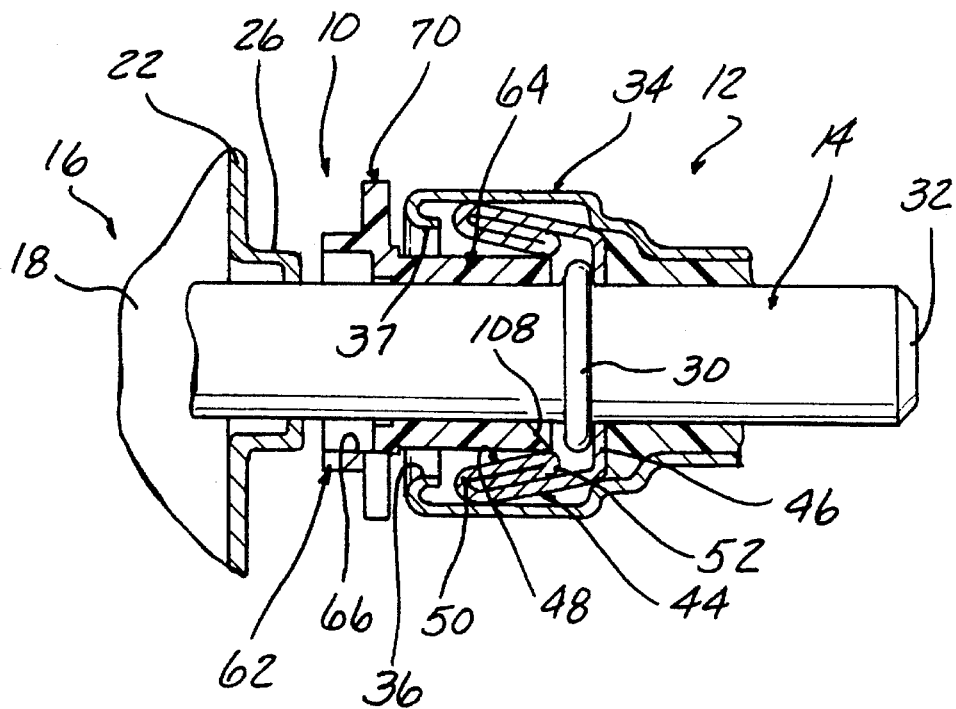
FIG. 9 is a cross sectional view, generally taken along line 5—5 in FIG. 4, but showing the release member in a position enabling disengagement of the quick connector from the fitting.

As shown in FIGS. 1, 5 and 9, the conventional quick connector 12 is formed of a hollow body 34 with a rolled in flange 36 formed at an open end 37. The inner diameter between the opposed edges of the flange 36 is sized to releasibly receive the fitting 14 mounted in and extending outward from the end wall 22 of the fuel filter 16.

The connector body 34 may be provided in different sizes so as to receive standard fittings 14 which typically have outer diameters of ¼, ⁵⁄₁₆ and ⅜ inches. The connector body 34 is typically formed with a stepped outer surface and a corresponding stepped internal bore providing a series of axially spaced shoulders. The connector body 34 extends from a large diameter first end formed by the rolled in flange 36 to a smaller diameter second end 38. At least one, and preferably two or more, axially spaced projections, 40 such as annularly enlarged portions shown in FIG. 1 are formed adjacent to the second end 38 of the connector body 34 for securely mounting one end of a fluid conduit 42, such as a flexible hose, over the end portion of the connector body 34.

As the quick connector 12 is conventional, further details pertaining to the construction of the quick connector 12 as well as standard sealing elements, such as O-rings, spacers, bearings or top hats, typically employed in quick-type connectors, are not described or illustrated in the drawing for reasons of clarity. Details of such components can be had by referring to U.S. Pat. No. 5,213,376, the pertinent portions of which are incorporated herein by reference.

As shown in FIG. 5, a retainer element 44 is mounted within the connector body 34. The retainer element 44 has a generally annular base 46 with a central aperture formed therein for slidably receiving the fitting 14 therethrough, with the base 46 engaging one side of the enlarged annular flange 30.

The retainer element 44 is formed of a suitable flexible or resilient material, such as plastic or metal. Further, the retainer element 44 is formed with a plurality of circumferentially spaced tangs or legs 48 which extend angularly and radially outward from the base 46. Each tang or leg 48 terminates in a rolled-over end portion 50 which projects radially and angularly inward toward the base 46 and terminates in an end 52. The spacing between opposed outer ends 52 of the legs 48 is sized to receive and snap over and behind the annular flange 30 on the fitting 14 as shown in FIG. 5. In this manner, the fitting 14 may be slidably inserted into the open end 37 of the connector body 34 with the annular flange 30 forcing the deflectable legs 44 radially outward until the annular flange 30 seats in the gap adjacent the base 46 and the outer ends 52 of the legs 48 of the retainer element 44.

To disengage the connector 12 from the fitting 14, the ends 52 of the legs 48 of the retainer element 44 must be urged radially outward to clear the outer diameter of the annular flange 30 on the fitting 14. To affect this radial movement in a preferred embodiment, the release member 10 of the present invention is slidably mounted over the fitting 14 and extends into the open end 37 of the connector 12.

The release member 10 is formed of a suitable stiff, yet resilient material. For example, the release member 10 may be formed of Nylon 6, 6, Nylon 6, 12, high density polypropylene, talc-filled polypropylene, etc.

As shown in FIGS. 2 and 5, the release member 10 is in the form of an integral, one-piece body having opposed, axially-aligned first and second end portions 62 and 64, respectively. However, it will be understood that the release member 10 may be formed of a two-part body, with each half part or section hinged together or otherwise connectible to effect mounting about the fitting 14.

The first and second end portions 62 and 64 are generally cylindrical, with the first end portion 62 having a bore 66 formed therein and the second end portion 64 having a bore 68 formed therein. The bores 66 and 68 are axially aligned and in communication with each other. The bore 66 in the first end portion 62 has diameter sized to slidably, yet snugly mount about the outer diameter of the shoulder 24 or 26 on the fuel filter 16. Alternately, if the component 16 does not have an annular shoulder 24 or 26, then the diameter of the bore 66 in the first end portion 62 of the release member 10 is sized to slidably mount over the outer diameter of a portion of the fitting 14 adjacent to the end wall 22 of the component, such as the fuel filter 16.

In a preferred embodiment, a flange 70 is integrally formed in the release member 10 intermediate the first and second end portions 62 and 64. The flange 70 extends radially outward from the first and second end portions 62 and 64 and has an outer diameter greater than the outer diameter of the first end portion 62. The flange 70 forms an engagable surface means, as described hereafter. Further, although the flange 70 is depicted as being substantially circular in form, it will be understood that the flange 70 may have a limited circumferential extent so as to extend only over a portion of the circumference of the release member 10. The first end portion 62 has a longitudinal length sufficient to space the flange 70 from the adjacent surface of the component 16, such as the end wall 22 of the fuel filter 16.

The bore 68 in the second end portion 64 is sized to slidably mount over a portion of the fitting 14, as shown in FIG. 5. The second end portion 64 has a length so as to normally extend a short distance into the open end 37 of the connector 12 when the first end portion 62 is disposed in close proximity to or in abutment with the end wall 22 of an fuel filter 16. In this normal, non-use, mounting position, the outer end 72 of the second end portion 64 is spaced from the ends 52 of the deflectable legs 48 of the retainer element 44 mounted in the connector 12 and is also spaced from the upset or radial flange 30 on the fitting 14. The flange 70 also serves to retain the release tool 10 on the fitting 14 since axial sliding movement of the release tool 10, as described hereafter, will bring the end 72 of the second end portion 64 only into close proximity to or engagement with the flange 30.

As shown in FIGS. 2, 3 and 4, a break means 80, preferably in the form of a longitudinally extending slot, is formed along the release member 10 in and through the first and second end portions 62 and 64 and the flange 70. The break means or slot 80 defines an opening which enables the release member 10 to be slidably urged over and mounted on the fitting 14 and the shoulder 24 of the fuel filter 16 in a snap fit, while still enabling axial sliding movement of the release member 10 along the fitting 14 as described hereafter.

Figure 10:
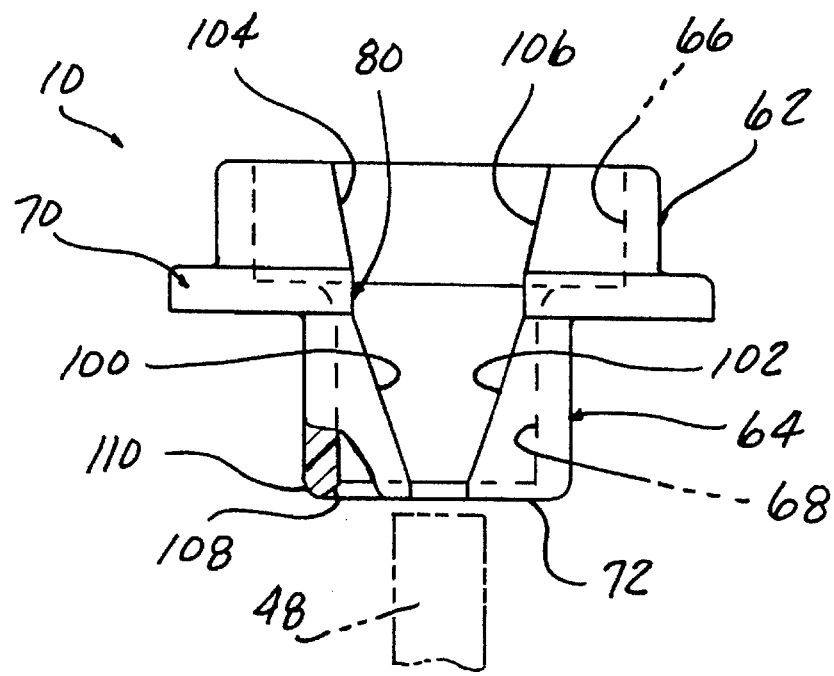
FIG. 10 is a plan view of the release member shown in FIGS. 2–4.

As shown in greater detail in FIG. 10, the break means or slot 80 forms two spaced edges 100 and 102 in the second end portion 64 extending from the end 72 to the flange 70. It is preferred that the edges 100 and 102 be disposed at an outwardly diverging angle with respect to each other from the end 72 to the flange 70. The width of the space between the edges 100 and 102 at the end 72 is selected to be less than the nominal width of the legs 48 on the retainer element 44. This insures that regardless of the circumferential position of the release member 10 about the connector 12, the entire peripheral edge of the end 72 will simultaneously engage all four of the legs 48 normally provided on the retainer element 44 to effect deflection of all four legs 48. The outwardly diverging edges 100 and 102 provide an easier snap-on action of the release member 10 about the connector 12. The opposed, spaced edges 104 and 106 formed by the break means 80 in the first end portion 62 diverge inwardly with respect to each other, from an outer end, although at a smaller angle of divergence than the angle of divergence between the edges 100 and 102 to provide the desired easy snap-on action.

Figure 11:
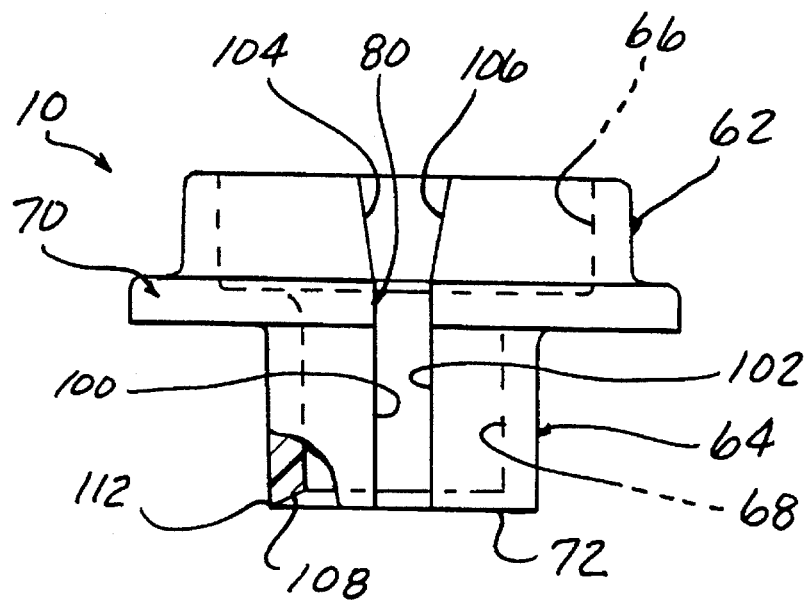
FIG. 11 is a plan view of another embodiment of the release member.

The end 72 of the first end portion 64 can have one of several different shapes including a flat, straight edge or a rounded bullnose edge. Preferably, as shown in FIG. 10, the end 72 is formed with a reverse tapered surface 108 extending inwardly from the end 72. The reverse tapered surface 108 can have a rounded outer edge 112 110 as shown in FIG. 10 or a sharp outer edge as shown in FIG. 11. The provision of the reverse tapered surface 108 provides a cam-like surface which aids in deflecting the legs 48 of the retainer 44 radially outward to de-couple the connector 12 from the fitting 14.

FIG. 11 depicts an alternate embodiment of the release member 10. In this embodiment, the edges 100 and 102 of the second end portion 64 are parallel to each other and to the axis of the bore 68 in the second end portion 64. However, the end spacing of the edges 100 and 102 is the same as that shown in FIG. 10 and described above. Further, FIG. 11 shows the sharp outer edge 112 on the surface 108.

Optionally at least one additional break or slot 82 is formed in the flange 70, preferably diametrically opposed to the slot 80, as shown in FIGS. 2 and 3. The slot 82 enables the two half sections of the flange 70 and the first and second end portions 62 and 64 to easily spread apart or open to effect mounting of the release member 10 about the fitting 14 and the shoulder 24 on the fuel filter 16.

According to the present invention, the release member 10 is provided with an engagable surface means, formed on the body of the release member 10, for facilitating axial sliding movement of the release member 10 along the fitting 14. The engagable surface means, in one embodiment, is the radially enlarged flange 70. The juncture of the flange 70 and the outer surface of the first end portion 62 of the release member 10 provides a convenient surface for engagement of a tool, such as a screwdriver, etc., with the release member 10 to permit forcible sliding movement of the release member 10 into the open end 37 of the connector 14.

Figure 6:
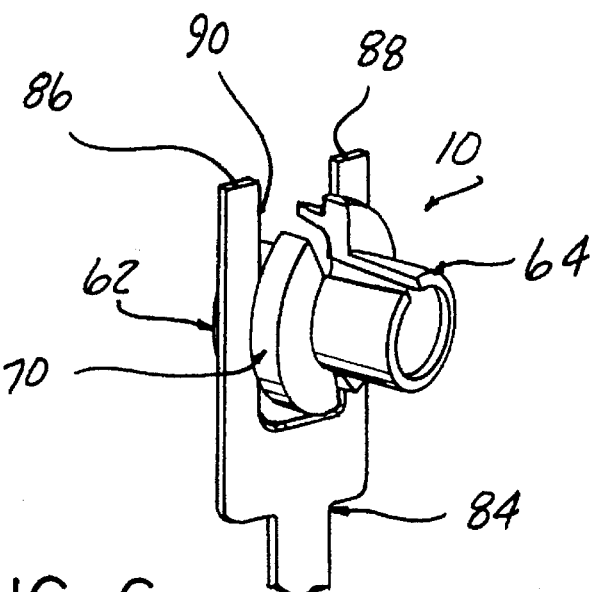
FIG. 6 is a perspective view of the release member of the present invention engaged by one embodiment of an engagement tool.

As shown in FIG. 6, a fork-like tool 84 having two spaced legs 86 and 88 disposed on opposite sides of and forming a slot 90 sized to releasibly engage the outer diameter of the first end portion 62 of the release member 10 may be urged into engagement with the release member 10 adjacent one side of the flange 70 to permit forcible sliding movement of the release member 10 into the open end 37 of the connector 12.

Figure 7:
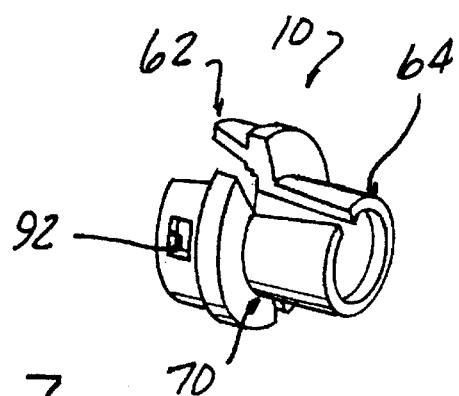
FIG. 7 is a perspective view of an alternate embodiment of the release member of the present invention.

An alternate embodiment of the engagable surface means is shown in FIG. 7. In this embodiment, the engagable surface means is in the form of at least one recess 92 formed in the first end portion 62 of the release member 10. A suitable tool, such as a screwdriver, may be inserted into the recess 92 to effect the desired forcible axial sliding movement of the release member 10. Additional circumferentially spaced recesses 92 may also be formed about the first end portion 62 of the release member 10.

Figure 8:
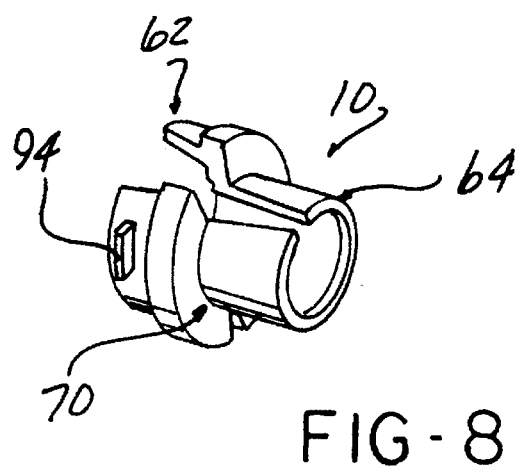
FIG. 8 is a perspective view of another embodiment of the release member of the present invention.

Yet another embodiment of the engagable surface means is shown in FIG. 8. In this embodiment, the engagable surface means is in the form of at least one raised projection 94 formed on the first end portion 62 of the release member 10. The projection 94 may have any suitable shape so as to provide a convenient abutment surface for engagement with a tool, such as a screwdriver.

In use, prior to attachment of the connector 12 to the fitting 14, the release member 10 is forcibly snapped over the end of the fitting 14 and the shoulder 24 of the component, such as the fuel filter 16, by urging the break means or slot 80 into engagement with the fitting 14 and the shoulder 24. This forcible engagement separates the opposed halves of the first and second end portions 62 and 64 and the flange 70 to permit the release member 10 to snap over the fitting 14 and the shoulder 24. This snap fit is sufficient to securely retain the release member 10 on the fitting 14 and shoulder 24; while still providing axial sliding movement of the release member 10 as described hereafter.

To disengage the connector 12 from the fitting 14, as shown in FIG. 9, the engagable surface means 70 on the release member 10 is utilized by engagement with a user's fingers, if space is available between the flange 70 and the adjacent end wall 20 of the fuel filter 16, or by a tool brought into engagement with the flange 70, the recess 92 or the projection 94. Force is exerted on the release member 10 resulting in axial sliding movement of the release member 10 from the normal mounting position shown in FIG. 5 to the release position shown in FIG. 9. In this position, the outer end 72 on the first end portion 64 of the release member 10 engages the ends 52 of the deflectable legs 48 of the retainer 44 and forcibly urges the legs 48 radially outward a sufficient distance to clear the outer diameter of the flange 30 on the fitting 14. This permits the connector 12 to be disengaged by axial sliding movement from the fitting 14.

In summary, there has been disclosed a unique release member or tool for use in disconnecting a fitting and a quick connector containing an internal retainer element. The release member of the present invention is designed for use in applications where there is a limited amount of space between the open end of the quick connector and the outer end of a component or structure on which the fitting is mounted. The release member is easily snapped over the fitting into a mounting position While being capable of being forcibly slid along the fitting into the open end of the connector to disengage the retainer element from the enlarged flange or upset on the fitting.

What is claimed is:

1. A quick-type fluid connector apparatus comprising:

a component having an end wall;

a fitting extending outward from the end wall of the component, the fitting having an annular flange spaced from an outer end, the annular flange spaced from the end wall of the component;

a housing having an open tubular end and a bore extending from the open end band an intermediate shoulder in said bore;

the fitting insertable into the open end of the bore in the housing;

a retainer mounted in the bore in the housing and means including said intermediate shoulder for retaining the retainer in said housing bore, the retainer having a plurality of circumferentially spaced, deflectable legs with outer ends spaced from said intermediate shoulder in the bore to form an opening for receiving the annular flange on the fitting therein in locking engagement with the outer ends of the deflectable legs, an inner diameter between opposed outer ends of the deflectable legs being a first nominal diameter less than an outer diameter of the annular flange on the fitting;

release means, separably and slidably mounted on the fitting between the end wall of the component and the open end of the housing, for effecting disengagement of the housing from the fitting upon axial sliding movement of the release means through the housing into engagement with the retainer, the release means including:

a body having first and second end portions;

a through bore extending through each of the first and second end portions;

break means, formed longitudinally end to end in and through the first and second end portions of the body, for enabling the body to be snapped over the fitting; and retainer leg engagement surface means, formed on the second end portion of the body, and engagable with the deflectable legs of the retainer upon axial movement of the release means into the bore in the housing to radially outwardly deflect the deflectable legs a sufficient distance to enable the annular flange on the fitting to be disengaged from the retainer and separated from the housing.

2. The quick-type fluid connector apparatus of claim 1 further comprising:

engagable surface means, formed on the body, for facilitating axial sliding movement of the body along the fitting and into the housing into engagement with the retainer.

3. The quick-type fluid connector apparatus of claim 2 wherein the engagable surface means comprises:

at least one recess formed in the first end portion of the body.

4. The quick-type fluid connector apparatus of claim 2 wherein the engagable surface means comprises:

at least one raised projection formed on the first end portion of the body.

5. The quick-type fluid connector apparatus of claim 2 wherein:

the through bore in the first and second end portions has different diameters.

6. The quick-type fluid connector apparatus of claim 2 wherein:

the body is formed of a resilient plastic.

7. The quick-type connector apparatus of claim 2 wherein:

the component has an annular shoulder formed on and extending outward from the end wall, the annular shoulder concentrically surrounding the fitting, the first end portion of the body of the release member concentrically engagable with the shoulder on the component when the body is in a non-use position.

8. The quick-type fluid connector apparatus of claim 2 wherein the engagable surface means comprises:

a flange carried between the first and second end portions of the body and extending radially outward from the body, the break means extending through the flange.

9. The quick-type connector apparatus of claim 8 further comprising:

the flange forming an engagable surface for facilitating axial sliding movement of the body along the fitting into the housing.

10. The quick-type fluid connector apparatus of claim 8 further comprising:

at least one radially extending slot formed in the flange to facilitate a snap action of the body over the fitting.

11. The quick-type fluid connector apparatus of claim 10 wherein:

the at least one radially extending slot is diametrically opposed to the break means.

12. The quick-type connector apparatus of claim 1 wherein:

the break means forms opposed, spaced edges in the second end portion of the body.

13. The quick-type connector apparatus of claim 12 wherein:

the opposed edges of the second end portion diverge outwardly from each other from an outer end of the second end portion.

14. The quick-type connector apparatus of claim 1 wherein:

the retainer leg engagement surface means is a longitudinally extending tapered surface formed on the outer end of the second end portion.

15. The quick-type connector apparatus of claim 14 wherein:

the tapered surface has a arcuate outer edge.

16. The quick-type connector apparatus of claim 14 wherein:

the tapered surface has a pointed outer edge.

17. The quick-type connector apparatus of claim 1 wherein:

the break means forms opposed, spaced edges in the first end portion.

18. The quick-type connector apparatus of claim 17 wherein:

the opposed edges of the first end portion converge inwardly toward each other from an outer end to the second end portion.

* * * * *